United States Patent
Lu et al.

(10) Patent No.: US 10,262,628 B2
(45) Date of Patent: Apr. 16, 2019

(54) DISPLAY METHOD

(71) Applicant: AU Optronics Corporation, Hsin-Chu (TW)

(72) Inventors: Min-Yao Lu, Hsin-Chu (TW); Hsiang-Yuan Hsieh, Hsin-Chu (TW); Chin-Tang Chuang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/180,161

(22) Filed: Nov. 5, 2018

(65) Prior Publication Data

US 2019/0073983 A1 Mar. 7, 2019

Related U.S. Application Data

(62) Division of application No. 15/389,583, filed on Dec. 23, 2016.

(30) Foreign Application Priority Data

Jan. 8, 2016 (TW) .............................. 105100578 A

(51) Int. Cl.
| | |
|---|---|
| *G09G 5/02* | (2006.01) |
| *G09G 5/10* | (2006.01) |
| *G06T 7/90* | (2017.01) |
| *G09G 5/18* | (2006.01) |
| G09G 5/06 | (2006.01) |

(52) U.S. Cl.
CPC ................. *G09G 5/02* (2013.01); *G06T 7/90* (2017.01); *G09G 5/026* (2013.01); *G09G 5/10* (2013.01); *G09G 5/18* (2013.01); G09G 5/06 (2013.01); G09G 2310/0235 (2013.01); G09G 2320/0666 (2013.01)

(58) Field of Classification Search
CPC ............ G09G 5/02; G09G 5/026; G09G 5/18; G09G 5/10; G09G 2310/0235; G09G 5/06; G09G 2320/0666; G06T 7/90
USPC ........................................................ 382/162
See application file for complete search history.

(56) References Cited

U.S. PATENT DOCUMENTS

| | | | |
|---|---|---|---|
| 7,643,019 | B2 | 1/2010 | Velthoven et al. |
| 8,179,401 | B2 | 5/2012 | Ishii |
| 8,184,087 | B2 | 5/2012 | Lin et al. |
| 8,588,544 | B2 | 11/2013 | Lei et al. |

(Continued)

FOREIGN PATENT DOCUMENTS

TW       I410938       2/2010

*Primary Examiner* — Amandeep Saini
(74) *Attorney, Agent, or Firm* — WPAT. PC

(57) ABSTRACT

A display method includes: receiving an input signal; performing a color separation process on the input image to generate color information and an intensity image; performing a filtering process on the intensity image to generate an intensity coarse image and an edge image; generating a color coarse image according to the intensity coarse image and the color information; performing a pure color analysis on the color coarse image to generate a first pure color coarse image, a second pure color coarse image and a third pure color coarse image; and displaying the first pure color coarse image, the second pure color coarse image, the third pure color coarse image and the edge image in a first time period, a second time period, a third time period and a fourth time period respectively.

7 Claims, 6 Drawing Sheets

(56) References Cited

U.S. PATENT DOCUMENTS

| 8,675,030 B2 | 3/2014 | Doyen et al. |
| 2007/0046914 A1 | 3/2007 | Lee |
| 2010/0090937 A1 | 4/2010 | Cheng et al. |
| 2012/0007900 A1 | 1/2012 | Hiroshi Mural et al. |
| 2012/0257833 A1* | 10/2012 | Guo ........................ H04N 5/142 382/199 |
| 2014/0232767 A1 | 8/2014 | Hammer et al. |

* cited by examiner

DISPLAY METHOD

CROSS-REFERENCE TO RELATED APPLICATION

This application claims priority to Taiwan application number 105100578, filed Jan. 8, 2016, the contents of which are incorporated hereby by reference.

TECHNICAL FIELD

The present disclosure relates to a display method, and in particular, to a display method for reducing the phenomenon of color breakup (CBU).

BACKGROUND ART

With the popularization of electronic products, liquid crystal displays are widely used in 3C products such as TVs, mobile phones, notebook PCs, and tablets. Generally, a conventional liquid crystal display requires using a color filter and a number of transistors to display images with different colors. Therefore, in order to save the used internal space and the cost of a display device, a field sequential color (FSC) display device has been developed currently, which can emit red, green, and blue light by means of different light sources respectively at specific times, and uses the three primary colors as a mixed color.

Because the switch speed of the FSC display device exceeds the perceiving frequency of human eyes (i.e., 60 Hz), the human brain may superpose all the images because of the persistence of vision, enabling a user to percept a full-color display. Ideally, pixels corresponding to the three colors in the FSC display device are projected onto the same positions on the retina, such that the color information of each pixel can be fully reproduced visually.

However, if the pixels corresponding to the three colors in the FSC display device are projected onto different positions on the retina, the user will observe an image with the color field separation misplaced, i.e., the phenomenon of color separation (CBU). The CBU phenomenon is particularly serious at the edge of an object in an image.

SUMMARY

One aspect of the present disclosure is to provide a display method applicable to a display device. The display method comprises: receiving an input image; performing a color separation process on the input image to generate color information and an intensity image; performing a filtering process on the intensity image to generate an intensity coarse image and an edge image; generating a color coarse image according to the intensity coarse image and the color information; performing a pure color analysis on the color coarse image to generate a first pure color coarse image, a second pure color coarse image, and a third pure color coarse image; and displaying the first pure color coarse image, the second pure color coarse image, the third pure color coarse image, and the edge image in a first time period, a second time period, a third time period, and a fourth time period respectively.

A next aspect of the present disclosure is to provide a display method applicable to a display device. The display method comprises: receiving an input image; performing a filtering process on the input image to generate a color coarse image and a first edge image; performing a color gamut correction process on the color coarse image to generate a corrected image; performing a pure color analysis on the corrected image to generate a first pure color coarse image, a second pure color coarse image, and a third pure color coarse image; generating a white light image according to an intensity value of the first pure color coarse image, an intensity value of the second pure color coarse image, and an intensity value of the third pure color coarse image; generating a fourth pure color coarse image, a fifth pure color coarse image, and a sixth pure color coarse image corresponding to the first pure color coarse image, the second pure color coarse image, and the third pure color coarse image respectively according to the intensity value of the first pure color coarse image, the intensity value of the second pure color coarse image, the intensity value of the third pure color coarse image, and an intensity value of the white light image; generating a second edge image according to the first edge image and the white light image; and displaying the fourth pure color coarse image, the fifth pure color coarse image, the sixth pure color coarse image, and the second edge image in a first time period, a second time period, a third time period, and a fourth time period respectively.

Another aspect of the present disclosure is to provide a display method applicable to a display device. The display method comprises: receiving an input image; performing a filtering process on the input image to generate a color coarse image and a first edge image; performing a pure color analysis on the color coarse image to generate a first pure color coarse image, a second pure color coarse image, and a third pure color coarse image; generating a first energy weight value, a second energy weight value, and a third energy weight value corresponding to and according to an intensity value of the first pure color coarse image, an intensity value of the second pure color coarse image, and an intensity value of the third pure color coarse image; generating a multicolored image, a first weight image, and a second weight image according to the first energy weight value, the second energy weight value, and the third energy weight value; generating a second edge image according to the first edge image and the multicolored image; and displaying the first weight image, the second weight image, and the second edge image in a first time period, a second time period, and a third time period respectively.

BRIEF DESCRIPTIONS OF THE DRAWINGS

The above description and other objectives, features, and advantages of the present invention will become apparent with the following description of the accompanying figures.

DETAILED DESCRIPTIONS

The following disclosure provides a variety of different embodiments or examples to implement different features of the present invention. Components and configurations in special examples are used in the following discussion to simplify the present disclosure. Any example discussed is merely used for illustration, and is not intended, in any way, to limit the scope and meaning of the present invention or the examples thereof. In addition, the present disclosure may repeatedly cite numerals and/or letters in different examples, with the repetitions being used for simplification and illustration, and they do not specify the relations between different embodiments and/or configurations in the following discussion.

Terms used throughout the specification and claims, unless otherwise specified, generally possess a common meaning of each term used in the art, in the content of the present disclosure, and in a special content. Some terms describing the present disclosure will be discussed below or elsewhere in this specification, so as to provide additional guidance to those skilled in the art regarding the description of the present disclosure.

Additionally, the terms "coupled" and "connected" used herein may mean that two or more elements are in a direct physical or electrical contact or in an indirect physical or electrical contact, and "coupled" and "connected" may also mean that two or more elements co-operate or interact. It should be understood that, although the terms first, second, third, etc. may be used herein to describe various elements, components, regions, layers, and/or sections, these elements, components, regions, layers, and/or sections should not be limited by these terms. These words are only used to identify a single element, component, region, layer, and/or section. Thus, a first element, component, region, layer, and/or section below can also be termed as a second element, component, region, layer, and/or section, without departing from the scope of the present invention. As used herein, the word "and/or" contains any combination of one or more of the listed associated items.

Figure 1:
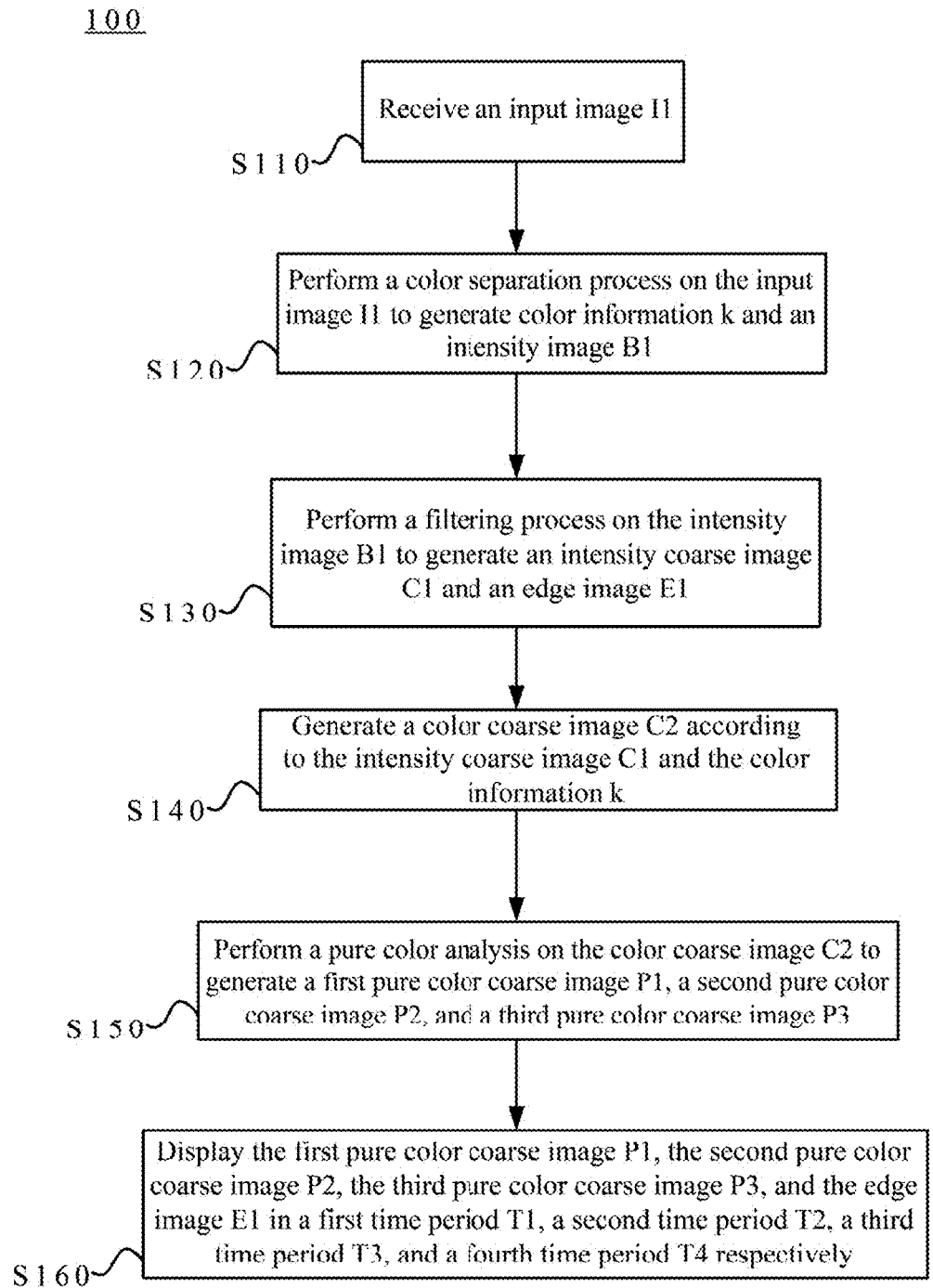
FIG. 1 is a schematic flow chart of a display method according to one embodiment of the present disclosure.
Figure 2:
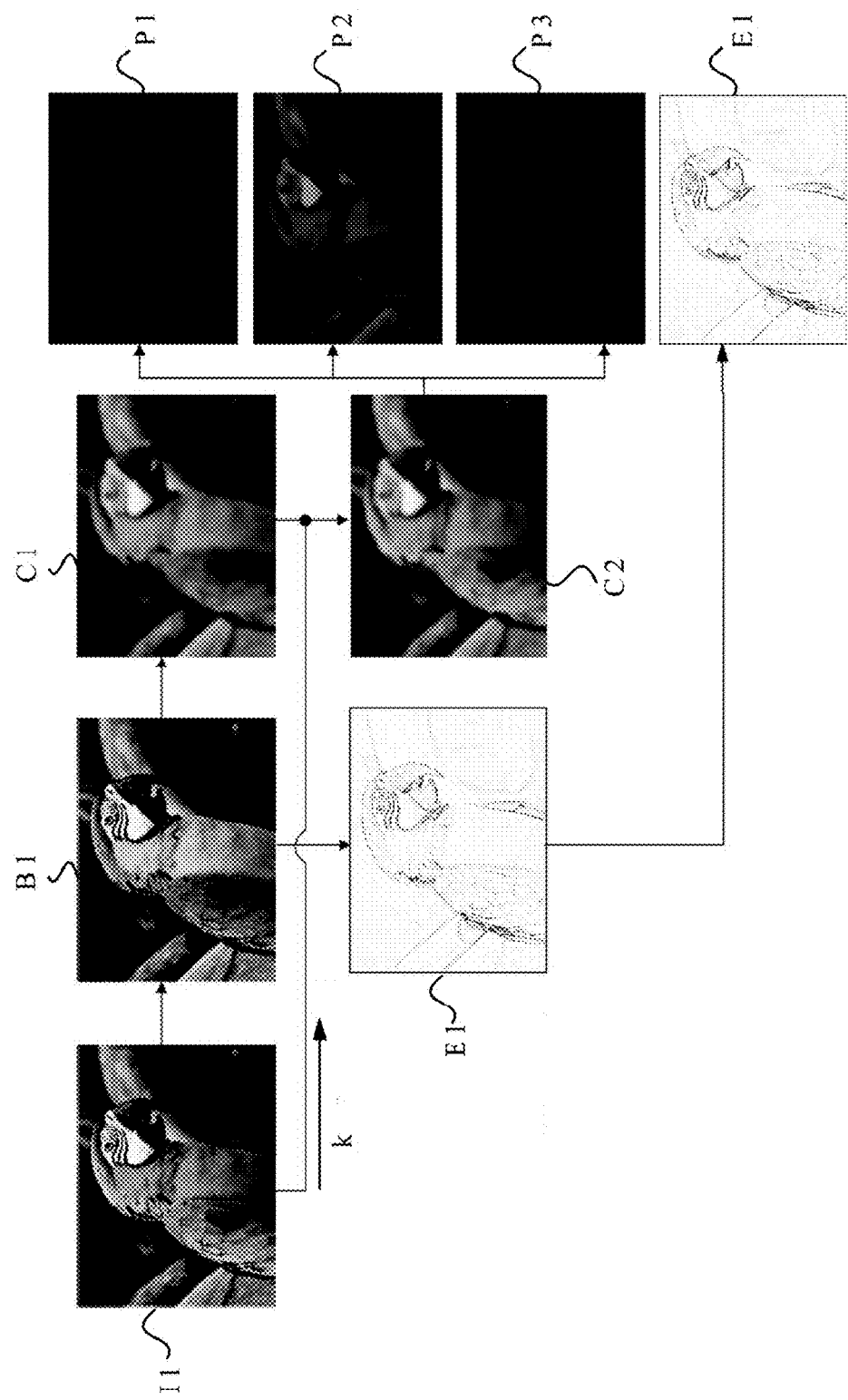
FIG. 2 is a schematic concept diagram according to the display method of FIG. 1.

Referring to FIG. 1 and FIG. 2 altogether, FIG. 1 is a schematic flow chart of a display method 100 according to one embodiment of the present disclosure. FIG. 2 is a schematic concept diagram according to the display method 100 of FIG. 1. The display method 100 is applicable to a display device, and the display device may be, for example, a field sequential color (FSC) display device or any display device with a display array, a backlight module, and a controller, and the present disclosure is not limited thereto. The display method 100 includes steps S110-S160.

The display method 100 firstly executes step S110: receiving an input image I1. The input image I1 may be, for example, any color photo or color pattern, and the present disclosure is not limited thereto. As shown in FIG. 2, the input image I1 is an image of a parrot resting on a branch, a color image in reality.

Then, the display method 100 executes step S120: performing a color separation process on the input image I1 to generate color information k and an intensity image B1. Generally, different colors in the input image I1 have different weight proportions. For example, when using the three primary colors, red, green, and blue in the analysis, each of the red, green, and blue in the input image I1 has a certain weight proportion. When the weight of red color in the input image I1 is higher, the input image I1 appears more in red color visually; when the weight of green in the input image I1 is higher, the input image I1 appears more in green color visually; and when the weight of blue in the input image I1 is higher, the input image I1 appears more in blue color visually. Thus, the color information k is the weight information of different colors in the input image I1, and step S120 separates the color information k of the input image I1 to obtain the intensity image B1. As shown in FIG. 2, the intensity parrot image B1 is obtained from the input image I1 by extracting the color information k from the color parrot image.

Then, the display method 100 executes step S130: performing a filtering process on the intensity image B1 to generate an intensity coarse image C1 and an edge image E1. Generally, due to a high degree of color change at the edge of an object in an image, the color breakup (CBU) phenomenon may occur at the edge of the object in the image easily, which may be the edge of the parrot and the edge of the branch or leaf in the case of FIG. 2; and thus step S130 performs the filtering process on the intensity image B1 to extract the edge image E1 and to generate the intensity coarse image C1. As shown in FIG. 2, after the filtering process is performed on the intensity image B1, the edge image E1 containing the edge of the parrot and the edge of the branch or leaf is extracted; and in the intensity coarse image C1, the edge of the object is unsharpened and fuzzed. In this embodiment, the filtering process may be a Sobel filtering process, a Laplacian filtering process, or any other image filtering processes.

Afterwards, the display method 100 executes step S140: generating a color coarse image C2 according to the intensity coarse image C1 and the color information k. As shown in FIG. 2, step S140 superposes the color information k obtained in step S120 and the intensity coarse image C1 obtained via the filtering process to obtain a color image (the color coarse image C2).

Then, the display method 100 executes step S150: performing a pure color analysis on the color coarse image C2 to generate a first pure color coarse image P1, a second pure color coarse image P2, and a third pure color coarse image P3. As described above, the pure color analysis herein may be the analysis based on the three primary colors, red, green, and blue, and is performed on the color coarse image C2 to obtain a first pure color coarse image P1 as a red coarse image, a second pure color coarse image P2 as a green coarse image, and a third pure color coarse image P3 as a blue coarse image. However, in other embodiments, the pure color analysis is not limited to the analysis performed based on the three primary colors of light; and instead, it may be the analysis performed according to any pure color to obtain a first pure color coarse image P1, a second pure color coarse image P2, and a third pure color coarse image P3.

Afterwards, the display method 100 executes step S160: displaying the first pure color coarse image P1, the second pure color coarse image P2, the third pure color coarse image P3, and the edge image E1 in a first time period T1, a second time period T2, a third time period T3, and a fourth time period T4 respectively. As shown in FIG. 2, the first pure color coarse image P1, the second pure color coarse image P2, the third pure color coarse image P3, and the edge image E1 are displayed in sequence. In some embodiments, the first time period T1, the second time period T2, the third time period T3, and the fourth time period T4 are merely different time periods without a fixed sequence. That is to say, the sequence of displaying the first pure color coarse image P1, the second pure color coarse image P2, the third pure color coarse image P3, and the edge image E1 is not limited to the sequence described above. For example, the edge image E1, the first pure color coarse image P1, the second pure color coarse image P2, and the third pure color coarse image P3 may be displayed in sequence; or for example, by sequence, the third pure color coarse image P3, the first pure color coarse image P1, the second pure color coarse image P2, and the edge image E1 may be displayed.

In this way, displaying different pure color images and edge images at different times effectively reduces the CBU phenomenon at the edge of an input image.

In addition, it can be seen that in this embodiment, the first time period T1, the second time period T2, the third time period T3, and the fourth time period T4 are equal to $\frac{1}{240}$s, and in reality, each time period is one quarter of a standard main frame time ($\frac{1}{60}$s); but in other embodiments, the main frame time may be less than $\frac{1}{60}$s, and the first time period T1, the second time period T2, the third time period T3, and the fourth time period T4 may be less than $\frac{1}{240}$s. Alternatively, in some embodiments, each time period may not be equal to one another. For example, the first time period T1 may be longer than the second time period T2, and the second time period T2 may be longer than the fourth time period T4, etc.

Figure 3:
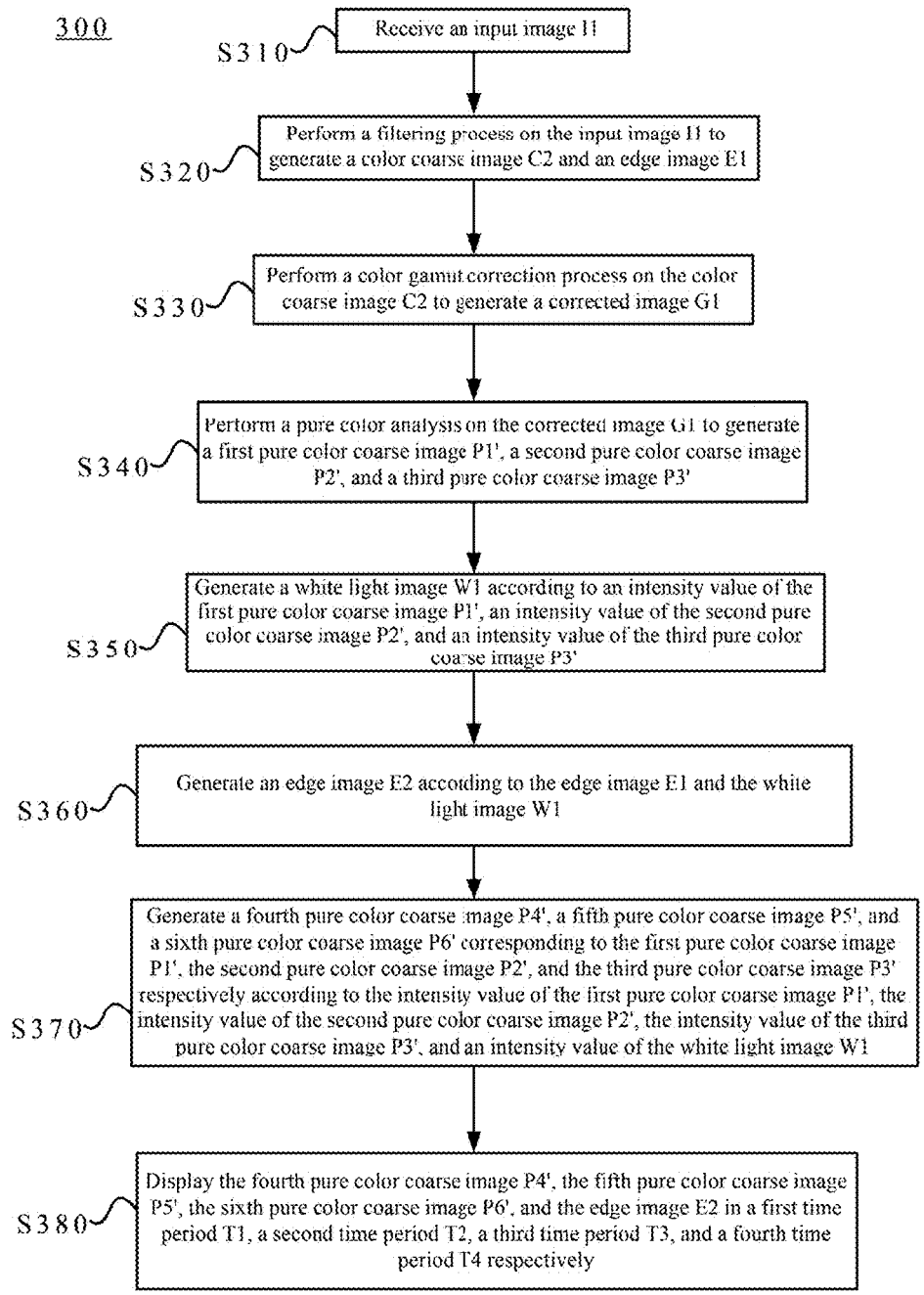
FIG. 3 is a schematic flow chart of a display method according to one embodiment of the present disclosure.
Figure 4:
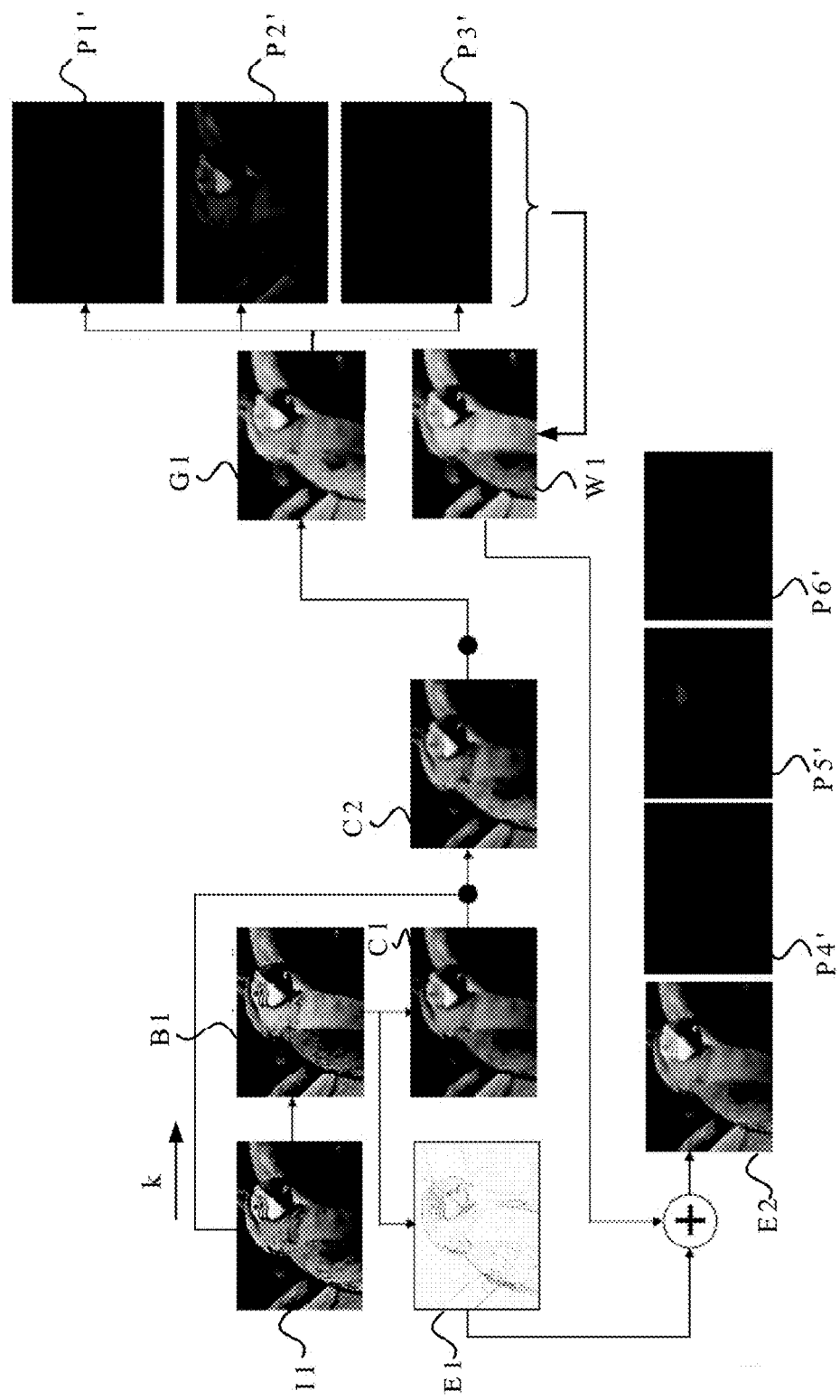
FIG. 4 is a schematic concept diagram according to the display method of FIG. 3.

In addition, the above examples contain exemplary steps performed in sequence, but these steps do not need to be performed by following the shown sequence. Performing these steps in different sequences also falls within the scope of the present disclosure. In addition, within the spirit and scope of the embodiments of the present invention, the steps may be added, substituted, varied in sequence, and/or omitted, depending on the situation. For example, the display method 100 in some embodiments may include an additional step to intensify the edge image E1, as shown in FIG. 3 and FIG. 4. FIG. 3 is a schematic flow chart of a display method 300 according to one embodiment of the present disclosure. FIG. 4 is a schematic concept diagram according to the display method 300 of FIG. 3. The display method 300 includes steps S310-S380.

The display method 300 firstly executes step S310: receiving an input image I1. Step S310 is similar to the above step S110, thus it will not be repeated herein.

Then, the display method 300 executes step S320: performing a filtering process on the input image I1 to generate a color coarse image C2 and an edge image E1. As shown in FIG. 4, in fact, the above steps S120-S140 are included in the process for generating the color coarse image C2 and the edge image E1 in step S320, thus these steps will not be repeated herein.

Afterwards, the display method 300 executes step S330: performing a color gamut correction process on the color coarse image C2 to generate a corrected image G1. In this embodiment, the color gamut correction process may be a Gamma correction process or any other nonlinear correction processes.

Then, the display method 300 executes step S340: performing a pure color analysis on the corrected image G1 to generate a first pure color coarse image P1', a second pure color coarse image P2', and a third pure color coarse image P3'. Step S340 is similar to the above step S150, with the only difference being that the analysis is performed on the corrected image G1 instead of on the color coarse image C2; and thus the pure color analysis may be based on the three primary colors, red, green, and blue, and is performed on the corrected image G1 to obtain a first pure color coarse image P1' as a red coarse image, a second pure color coarse image P2' as a green coarse image, and a third pure color coarse image P3' as a blue coarse image. However, in other embodiments, the pure color analysis is not limited to the analysis performed based on the three primary colors of light, and instead, it may be the analysis performed according to any pure color, to obtain a first pure color coarse image P1', a second pure color coarse image P2', and a third pure color coarse image P3'.

Then, the display method 300 executes step S350: generating a white light image W1 according to an intensity value of the first pure color coarse image P1', an intensity value of the second pure color coarse image P2', and an intensity value of the third pure color coarse image P3'. Further, each of the pure color coarse images P1'-P3' has an intensity value, and the intensity values correspond to the color weights of different pure colors. For example, the intensity value of the first pure color coarse image P1' corresponds to the color weight of red; the intensity value of the second pure color coarse image P2' corresponds to the color weight of green; and the intensity value of the third pure color coarse image P3' corresponds to the color weight of blue. Therefore, the white light image W1 in this embodiment may be generated according to a minimum value, a maximum value, or any one of the above three intensity values. For example, below the minimum numeral value is taken as an example. When the intensity values corresponding to the pure color coarse images P1'-P3' are 75, 150, and 120 respectively, i.e., the minimum value 75 of the intensity values corresponds to the color weight of red, the pure color coarse images P1'-P3' having the intensity values of 75, 75, and 75 respectively are superposed to generate the white light image W1. Similarly, when the intensity values corresponding to the pure color coarse images P1'-P3' are respectively 125, 100, and 180, i.e., the minimum value 100 of the intensity values corresponds to the color weight of green, the pure color coarse images P1'-P3' having the intensity values of 100, 100, and 100 respectively are superposed to generate the white light image W1. The above examples are merely illustrated with the minimum value; and in the actual application, the white light image W1 may be generated according to the minimum value, the maximum value, or any one of the above three intensity values.

Afterwards, the display method 300 executes step S360: generating an edge image E2 according to the edge image E1 and the white light image W1. The white light image W1 generated in step S350 is superposed with the edge image E1 to generate the edge image E2.

Then, the display method 300 executes step S370: generating a fourth pure color coarse image P4', a fifth pure color coarse image P5', and a sixth pure color coarse image P6' corresponding to the first pure color coarse image P1', the second pure color coarse image P2', and the third pure color coarse image P3' respectively according to the intensity value of the first pure color coarse image P1', the intensity value of the second pure color coarse image P2', the intensity value of the third pure color coarse image P3', and an intensity value of the white light image W1. Specifically, the intensity value of the fourth pure color coarse image P4' may be a difference between the intensity value of the first pure color coarse image P1' and that of the white light image W1; the intensity value of the fifth pure color coarse image P5' may be a difference between the intensity value of the second pure color coarse image P2' and that of the white light image W1; and the intensity value of the sixth pure color coarse image P6' may be a difference between the intensity value of the third pure color coarse image P3' and that of the white light image W1. The above examples may be presented with Equation (1) as follows:

$$P4'=P1'-W1$$
$$P5'=P2'-W1$$
$$P6'=P3'-W1 \qquad \text{Equation (1)}$$

wherein P1', P2', P3', P4', P5', P6', and W1 are the intensity values of the first pure color coarse image P1', the second pure color coarse image P2', the third pure color coarse image P3', the fourth pure color coarse image P4', the fifth pure color coarse image P5', the sixth pure color coarse image P6', and the white light image W1 respectively.

Then, the display method 300 executes step S380: displaying the fourth pure color coarse image P4', the fifth pure color coarse image P5', the sixth pure color coarse image P6', and the edge image E2 in a first time period T1, a second time period T2, a third time period T3, and a fourth time period T4 respectively. As shown in FIG. 4, the fourth pure color coarse image P4', the fifth pure color coarse image P5', the sixth pure color coarse image P6', and the edge image E2' are displayed in sequence. As described above, the first time period T1, the second time period T2, the third time period T3, and the fourth time period T4 are merely different time periods, without a fixed sequence. That is to say, the sequence of displaying the fourth pure color coarse image P4', the fifth pure color coarse image P5', the sixth pure color coarse image P6', and the edge image E2' is not limited to the sequence described above. For example, the edge image E2, the fourth pure color coarse image P4', the fifth pure color coarse image P5', and the sixth pure color coarse image P6' may be displayed in sequence; or for example, by sequence, the sixth pure color coarse image P6', the fourth pure color coarse image P4', the fifth pure color coarse image P5', and the edge image E2 may be displayed. Accordingly, the edge image is enhanced through the white light image so that the inhibition on the CBU phenomenon is further attenuated.

Similarly, in this embodiment, the first time period T1, the second time period T2, the third time period T3, and the fourth time period T4 are equal to $\frac{1}{240}$s; and in reality, each time period is one quarter of a standard main frame time ($\frac{1}{60}$s), but in other embodiments, the main frame time may be less than $\frac{1}{60}$s, and the first time period T1, the second time period T2, the third time period T3, and the fourth time period T4 may be less than $\frac{1}{240}$s. Alternatively, in some embodiments, each time period may not be equal to one another. For example, the first time period T1 may be longer than the second time period T2, and the second time period T2 may be longer than the fourth time period T4, etc.

Figure 5:
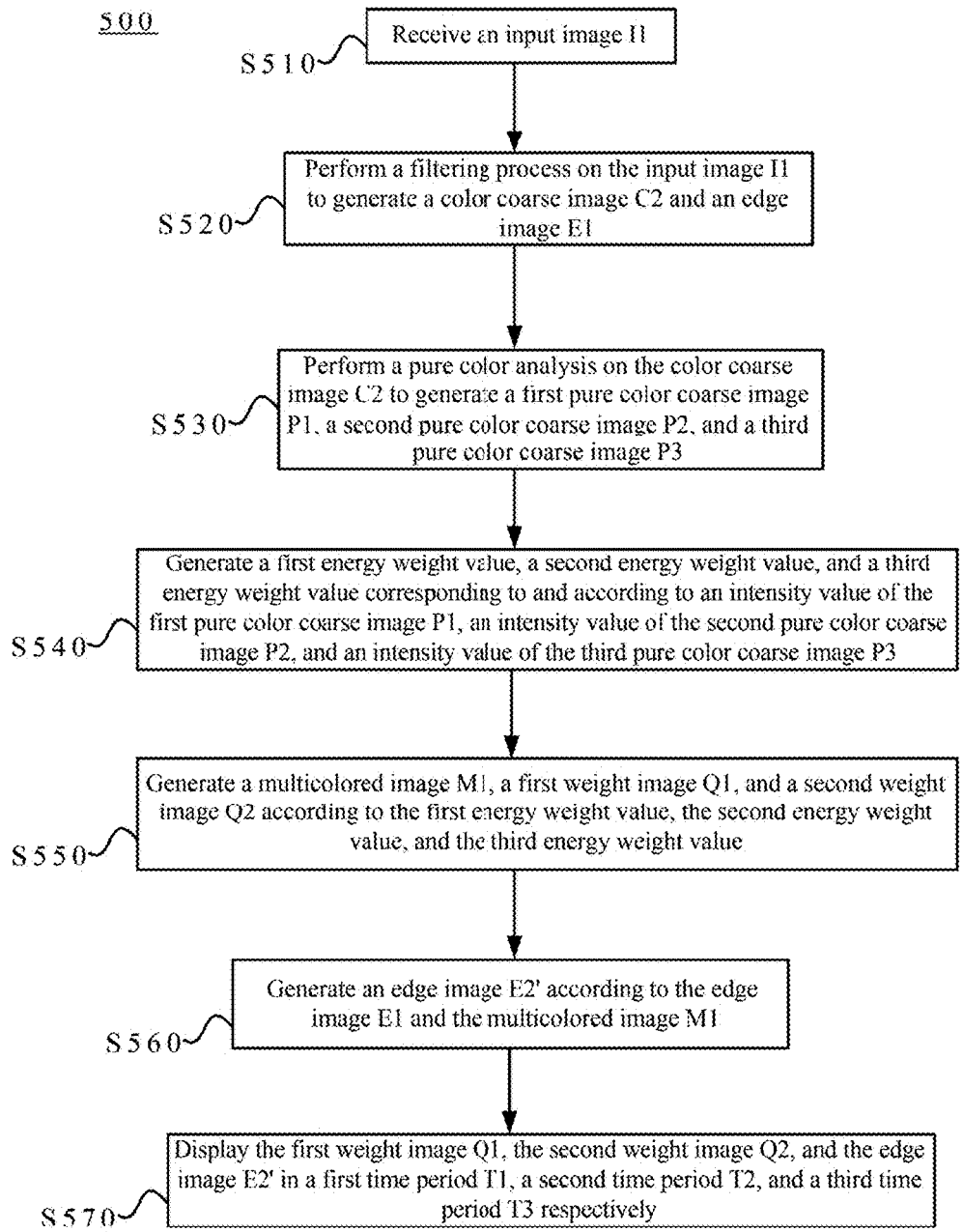
FIG. 5 is a schematic flow chart of a display method according to one embodiment of the present disclosure.

In some embodiments, not only the edge image can be enhanced, the frequency of displaying sub-frames can also be further decreased. Now please refer to FIG. 5. FIG. 5 is a schematic flow chart of a display method 500 according to one embodiment of the present disclosure. The display method 500 includes steps S510-S570.

The display method 500 firstly executes step S510: receiving an input image I1. Step S510 is similar to the above step S110, thus it will not be repeated herein.

Then, the display method 500 executes step S520: performing a filtering process on the input image I1 to generate a color coarse image C2 and an edge image E1. In fact, step 520, a process to generate the color coarse image C2 and the edge image E1, includes the above steps S120-S140, thus this step will not be repeated herein.

Afterwards, the display method 500 executes step S530: performing a pure color analysis on the color coarse image C2 to generate a first pure color coarse image P1, a second pure color coarse image P2, and a third pure color coarse image P3. Step S530 is similar to the above step S150, thus it will not be repeated herein.

Afterwards, the display method 500 executes step S540: generating a first energy weight value, a second energy weight value, and a third energy weight value corresponding to and according to an intensity value of the first pure color coarse image P1, an intensity value of the second pure color coarse image P2, and an intensity value of the third pure color coarse image P3; and step S550 is also executed: generating a multicolored image M1, a first weight image Q1, and a second weight image Q2 according to the first energy weight value, the second energy weight value, and the third energy weight value. Step S550 actually includes step S551, determining a minimum value among the first energy weight value, the second energy weight value, and the third energy weight value, and step S552, calculating an intensity value of the first weight image Q1 and an intensity value of the second weight image Q2 according to the minimum value.

Figure 6:
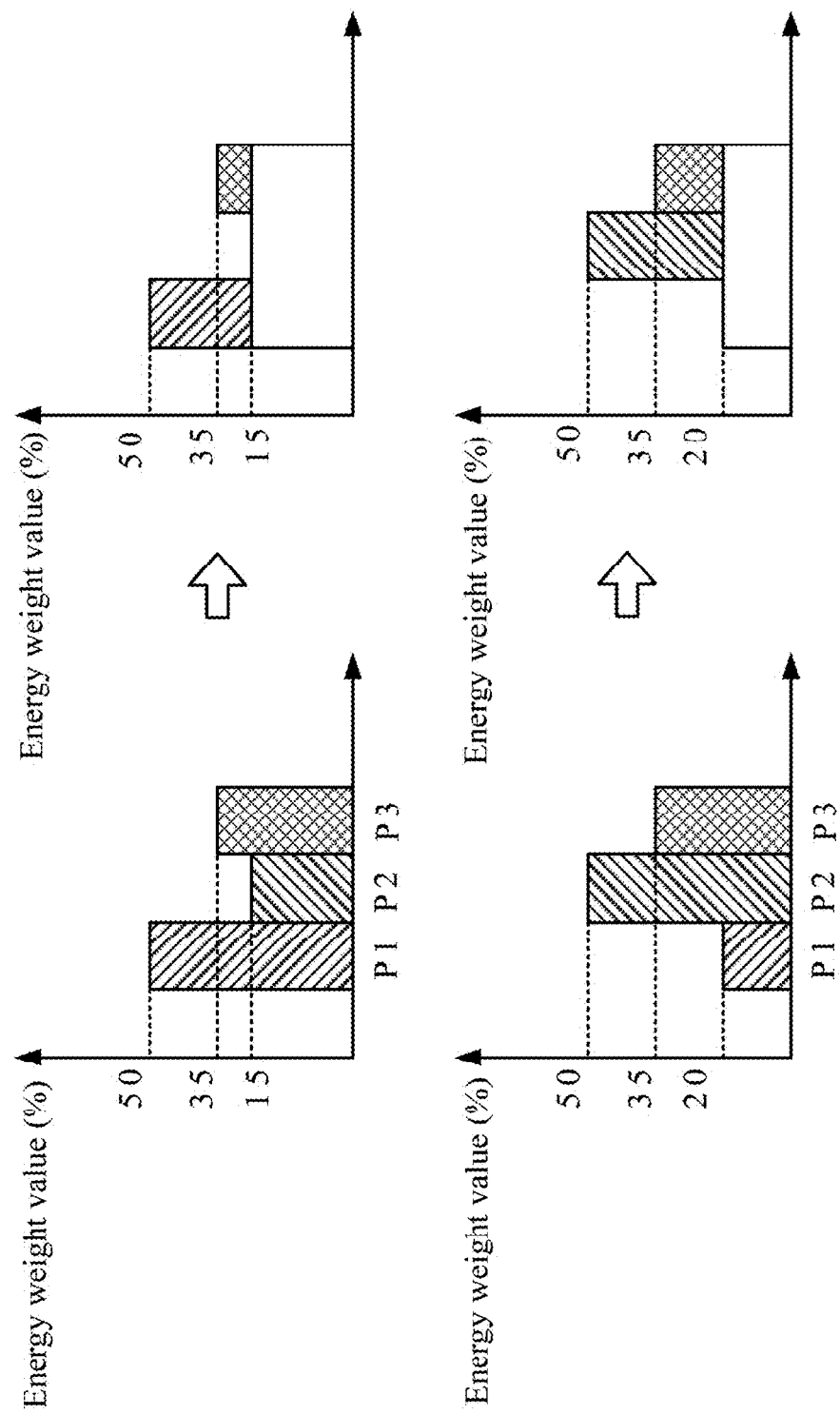
FIG. 6 is a schematic concept diagram according to the steps of the display method of FIG. 5.

Further, with reference to FIG. 6, a schematic concept diagram drawn according to steps S540 and S550 of the display method 500 of FIG. 5. As described above, the intensity values represent the color weights corresponding to different pure colors, and FIG. 6 further illustrates the intensity values, corresponding to different pure colors, based on the energy weights relations thereof. As shown in the upper half of FIG. 6, the first energy weight value, the second energy weight value, and the third energy weight value may be 50%, 15%, and 35% respectively. It can be seen that the minimum value 15% among these is the second energy weight value corresponding to the intensity value of the second pure color coarse image P2. Then, the second energy weight value is subtracted from the first energy weight value corresponding to the intensity value of the first pure color coarse image P1 and the third energy weight value corresponding to the intensity value of the third pure color coarse image P3 respectively to serve as the energy weight values (which are 50%-15%=35%, and 35%-15%=20% respectively) corresponding to the intensity values of the first weight image Q1 and the second weight image Q2; and the first weight image Q1 and the second weight image Q2 are obtained according to the energy weight values corresponding to the intensity values of the first weight image Q1 and the second weight image Q2. That is, in this example, the first pure color coarse image P1 having the energy weight value of 35% is taken as the first weight image Q1, and the third pure color coarse image P3 having the energy weight value of 20% is taken as the second weight image Q2. In another aspect, the multicolored image M1 is generated by superposing the first pure color coarse image P1 having the energy weight value of 15%, the second pure color coarse image P2 having the energy weight value of 15%, and the third pure color coarse image P3 having the energy weight value of 15% respectively. Besides, in reality, the energy distribution of the frames in the display device is non-uniform; namely, the intensity values of the pixels are different from one another, and thus the multicolored image M1 generated from the energy weight values each occupying 15% may be an image having the pixels of different colors. Similarly, as shown in the lower half of FIG. 6, the first energy weight value, the second energy weight value, and the third energy weight value may be 20%, 50%, and 35% respectively, and thus the minimum value 20% among these is the first energy weight value corresponding to the intensity value of the first pure color coarse image P1. Then, the first energy weight value is subtracted from the second energy weight value corresponding to the intensity value of the second pure color coarse image P2 and the third energy weight value corresponding to the intensity value of the third pure color coarse image P3 respectively to serve as the energy weight values (which are 50%-20%=30%, and 35%-20%=15% respectively) corresponding to the intensity values of the first weight image Q1 and the second weight image Q2; and the first weight image Q1 and the second weight image Q2 are obtained according to the energy weight values corresponding to the intensity values of the first weight image Q1 and the second weight image Q2. That is, in this example, the second pure color coarse image P2 having the energy weight value of 30% is taken as the first weight image Q1, and the third pure color coarse image P3 having the energy weight value of 15% is taken as the second weight image Q2. In another aspect, the multicolored image M1 is generated by superposing the first pure color coarse image P1 having the energy weight value of 20%, the second pure color coarse image P2 having the energy weight value of 20%, and the third pure color coarse image P3 having the energy weight value of 20% respectively.

Then, the display method 500 executes step S560: generating an edge image E2' according to the edge image E1 and the multicolored image M1. The multicolored image M1 generated in step S550 are superposed with the edge image E1 to generate the edge image E2'.

Then, the display method 500 executes step S570: displaying the first weight image Q1, the second weight image Q2, and the edge image E2' in a first time period T1, a second time period T2, and a third time period T3 respectively. As can be seen, in this embodiment, only fewer (three) displaying time periods need to be included. Accordingly, not only the edge image is enhanced through the white light image so that the inhibition on the CBU phenomenon is further attenuated, the frequency of displaying sub-frames can also be further decreased through the display of the weight images.

In this embodiment, the first time period T1, the second time period T2, and the third time period T3 are equal to $\frac{1}{180}$s. In reality, each time period is one third of a standard main frame time ($\frac{1}{60}$s); but in other embodiments, the main frame time may be less than $\frac{1}{60}$s, and the first time period T1, the second time period T2, the third time period T3, and the fourth time period T4 may be less than $\frac{1}{180}$s.

Based on the above, the present disclosure relates to a display method, and in particular, to a display method for reducing the CBU phenomenon. In the present disclosure, displaying different pure color images and edge images at different times effectively reduces the CBU phenomenon at the edge of an input image. In addition, in some embodiments, an edge image is enhanced through a white light image or a multicolored image, so the inhibition on the CBU phenomenon is further attenuated. Alternatively, in some embodiments, the weight images are displayed to decrease the frequency of displaying sub-frames.

Even though the present disclosure has been disclosed as the various embodiments described above, it is not limited thereto. Any person of ordinary skill in the art may make various changes and adjustments without departing from the spirit and scope of the present disclosure. Therefore, the scope of the present disclosure is defined in view of the appended claims.

What is claimed is:

1. A display method, comprising:
   receiving an input image;
   performing a filtering process on the input image to generate a color coarse image and a first edge image;
   performing a color gamut correction process on the color coarse image to generate a corrected image;
   performing a pure color analysis on the corrected image to generate a first pure color coarse image with a first intensity value, a second pure color coarse image with a second intensity value, and a third pure color coarse image with a third intensity value;
   generating a white light image with a white intensity value according to the first intensity value, the second intensity value, and the third intensity value;
   generating a fourth pure color coarse image corresponding to the first pure color coarse image, a fifth pure color coarse image corresponding to the second pure color coarse image, and a sixth pure color coarse image corresponding to the third pure color coarse image, according to the first intensity value, the second intensity value, the third intensity value, and the white intensity value;
   generating a second edge image according to the first edge image and the white light image; and
   displaying the fourth pure color coarse image, the fifth pure color coarse image, the sixth pure color coarse image, and the second edge image in a first time period, a second time period, a third time period, and a fourth time period respectively.

2. The display method according to claim 1, wherein the first pure color coarse image is a red coarse image, the second pure color coarse image is a green coarse image, and the third pure color coarse image is a blue coarse image.

3. The display method according to claim 1, wherein the first time period, the second time period, the third time period, and the fourth time period are less than or equal to $\frac{1}{240}$ second.

4. A display method, comprising:
   receiving an input image;
   performing a filtering process on the input image to generate a color coarse image and a first edge image;
   performing a pure color analysis on the color coarse image to generate a first pure color coarse image with a first intensity value, a second pure color coarse image with a second intensity value, and a third pure color coarse image with a third intensity value;
   generating a first energy weight value, a second energy weight value, and a third energy weight value corresponding to and according to the first intensity value, the second intensity value, and the third intensity value;
   generating a multicolored image, a first weight image with a fourth intensity value, and a second weight image with a fifth intensity value according to the first energy weight value, the second energy weight value, and the third energy weight value;
   generating a second edge image according to the first edge image and the multicolored image; and
   displaying the first weight image, the second weight image, and the second edge image in a first time period, a second time period, and a third time period respectively.

5. The display method according to claim 4, wherein the method further comprises:
   determining a minimum value among the first energy weight value, the second energy weight value, and the third energy weight value; and
   calculating the fourth intensity value and the fifth intensity value according to the minimum value.

6. The display method according to claim 4, wherein the first pure color coarse image is a red coarse image, the second pure color coarse image is a green coarse image, and the third pure color coarse image is a blue coarse image.

7. The display method according to claim 4, wherein the first time period, the second time period, and the third time period are less than or equal to $\frac{1}{180}$ second.

* * * * *